United States Patent
Kim et al.

(10) Patent No.: US 10,808,452 B2
(45) Date of Patent: Oct. 20, 2020

(54) DOUBLE GLAZED WINDOW OF POLYCARBONATE LAYER

(71) Applicant: Gwan-Ho Kim, Hanam-si, Gyeonggi-do (KR)

(72) Inventors: Gwan-Ho Kim, Hanam-si (KR); Sang-Su Jeong, Daejeon (KR)

(73) Assignee: Gwan-Ho Kim, Hanam-si (KR)

( * ) Notice: Subject to any disclaimer, the term of this patent is extended or adjusted under 35 U.S.C. 154(b) by 0 days.

(21) Appl. No.: 16/337,879

(22) PCT Filed: Apr. 7, 2017

(86) PCT No.: PCT/KR2017/003830
§ 371 (c)(1),
(2) Date: Mar. 28, 2019

(87) PCT Pub. No.: WO2018/079956
PCT Pub. Date: May 3, 2018

(65) Prior Publication Data
US 2020/0024893 A1 Jan. 23, 2020

(30) Foreign Application Priority Data
Oct. 26, 2016 (KR) .................. 10-2016-0139923

(51) Int. Cl.
*E06B 3/66* (2006.01)
*E06B 3/67* (2006.01)
(Continued)

(52) U.S. Cl.
CPC .............. *E06B 3/6612* (2013.01); *B32B 3/02* (2013.01); *B32B 5/18* (2013.01); *B32B 7/12* (2013.01);
(Continued)

(58) Field of Classification Search
None
See application file for complete search history.

(56) References Cited

U.S. PATENT DOCUMENTS 2,205,534 A * 6/1940 Lytle ................. E04C 2/296
428/166
3,471,356 A * 10/1969 Schreiber ............... B32B 17/06
428/317.1
(Continued)

FOREIGN PATENT DOCUMENTS

CN       201024620 Y  *  2/2008
CN       101481985 A  *  7/2009
(Continued)

OTHER PUBLICATIONS

Machine Translation of JP-2005146825-A, Jun. 2005 (Year: 2006).*
(Continued)

*Primary Examiner* — Jeffrey A Vonch
(74) *Attorney, Agent, or Firm* — KORUS Patent, LLC; Seong Il Jeong

(57) ABSTRACT

The present invention relates to a double glazed window of a polycarbonate layer and, specifically, to a double glazed window of a polycarbonate layer, comprising an outer glass layer and an inner polycarbonate layer so as to have improved heat insulation and earthquake resistance. The double glazed window of a polycarbonate layer comprises: a glass layer forming an outer layer; a polycarbonate layer forming an inner layer; a vacuum layer (VL) formed between the glass layer and the polycarbonate layer; and sealing means for sealing the VL while coupling the glass layer and the polycarbonate layer.

19 Claims, 2 Drawing Sheets

US 10,808,452 B2
Page 2

(51) Int. Cl.
*B32B 3/02* (2006.01)
*B32B 5/18* (2006.01)
*B32B 7/12* (2006.01)
*B32B 17/06* (2006.01)
*B32B 17/10* (2006.01)
*B32B 27/32* (2006.01)
*B32B 27/36* (2006.01)
*E06B 3/677* (2006.01)
*B32B 33/00* (2006.01)

(52) U.S. Cl.
CPC ...... *B32B 17/066* (2013.01); *B32B 17/10018* (2013.01); *B32B 17/10165* (2013.01); *B32B 17/10302* (2013.01); *B32B 27/365* (2013.01); *E06B 3/6715* (2013.01); *B32B 17/1055* (2013.01); *B32B 17/10174* (2013.01); *B32B 17/10743* (2013.01); *B32B 17/10798* (2013.01); *B32B 17/10807* (2013.01); *B32B 33/00* (2013.01); *B32B 2255/102* (2013.01); *B32B 2255/20* (2013.01); *B32B 2266/0264* (2013.01); *B32B 2266/08* (2013.01); *B32B 2266/12* (2016.11); *B32B 2266/14* (2016.11); *B32B 2305/022* (2013.01); *B32B 2305/026* (2013.01); *B32B 2307/304* (2013.01); *B32B 2307/408* (2013.01); *B32B 2307/412* (2013.01); *B32B 2315/08* (2013.01); *B32B 2369/00* (2013.01); *B32B 2419/00* (2013.01); *E06B 3/6775* (2013.01); *Y02A 30/25* (2018.01); *Y02B 80/24* (2013.01); *Y10T 428/24777* (2015.01); *Y10T 428/24999* (2015.04); *Y10T 428/249975* (2015.04); *Y10T 428/249976* (2015.04); *Y10T 428/249977* (2015.04); *Y10T 428/249979* (2015.04); *Y10T 428/249981* (2015.04); *Y10T 428/249984* (2015.04); *Y10T 428/249985* (2015.04); *Y10T 428/249991* (2015.04); *Y10T 428/31* (2015.01); *Y10T 428/31507* (2015.04)

(56) References Cited

U.S. PATENT DOCUMENTS

| | | | | |
|---|---|---|---|---|
| 4,305,982 A * | 12/1981 | Hirsch | A01G 9/1469 | 428/34 |
| 4,364,786 A * | 12/1982 | Smith, Jr. | B32B 17/10018 | 156/99 |
| 4,419,459 A * | 12/1983 | Melchior | C08J 9/32 | 521/59 |
| 4,473,665 A * | 9/1984 | Martini-Vvedensky | B29C 44/34 | 264/237 |
| 4,569,872 A | 2/1986 | Miller | | |
| 4,610,863 A * | 9/1986 | Tewari | B01J 13/0091 | 423/336 |
| 4,684,571 A * | 8/1987 | Kunert | B32B 5/18 | 428/314.8 |
| 4,928,448 A * | 5/1990 | Phillip | E06B 3/6612 | 52/179 |
| 5,092,101 A * | 3/1992 | Kunert | E04C 2/54 | 52/786.11 |
| 5,124,185 A * | 6/1992 | Kerr | E06B 3/6612 | 428/34 |
| 5,158,986 A * | 10/1992 | Cha | B29C 44/3446 | 264/50 |
| 6,199,933 B1 * | 3/2001 | Gielda | B60J 1/001 | 296/211 |
| 6,555,590 B1 * | 4/2003 | Tan | B29C 44/10 | 264/50 |
| 6,830,791 B1 * | 12/2004 | Misonou | E06B 3/66 | 428/34 |
| 9,440,662 B2 | 9/2016 | Kamaka et al. | | |
| 2005/0000623 A1 * | 1/2005 | Lindberg | B32B 17/10302 | 156/109 |
| 2005/0003148 A1 * | 1/2005 | Myles | B32B 7/12 | 428/116 |
| 2005/0074566 A1 * | 4/2005 | Rouanet | E04C 2/54 | 428/34 |
| 2007/0054110 A1 * | 3/2007 | Kawato | B32B 15/08 | 428/318.4 |
| 2007/0122588 A1 * | 5/2007 | Milburn | E06B 3/663 | 428/117 |
| 2007/0148379 A1 * | 6/2007 | Theios | E06B 3/677 | 428/34 |
| 2008/0020232 A1 * | 1/2008 | Winckler | B32B 17/06 | 428/626 |
| 2008/0063819 A1 * | 3/2008 | Monroe | E06B 3/66 | 428/34 |
| 2008/0118678 A1 * | 5/2008 | Huang | B32B 27/08 | 428/34 |
| 2008/0302059 A1 * | 12/2008 | Du Plessis | E06B 3/6775 | 52/786.11 |
| 2009/0029144 A1 * | 1/2009 | Borgsten | B32B 7/05 | 428/315.5 |
| 2009/0292034 A1 * | 11/2009 | Tomomatsu | C08L 69/00 | 521/134 |
| 2009/0324858 A1 * | 12/2009 | Jaeger | E06B 3/6617 | 428/34 |
| 2010/0101649 A1 * | 4/2010 | Huignard | C03C 17/006 | 136/261 |
| 2010/0146880 A1 * | 6/2010 | Valentz | E04C 2/543 | 52/200 |
| 2010/0163157 A1 * | 7/2010 | Milburn | E06B 3/6715 | 156/99 |
| 2010/0280171 A1 * | 11/2010 | Williams | C08J 5/04 | 524/570 |
| 2011/0120031 A1 * | 5/2011 | Scherba | E04C 2/543 | 52/202 |
| 2011/0195206 A1 * | 8/2011 | Colson | E06B 3/6715 | 428/34 |
| 2011/0296771 A1 * | 12/2011 | Miller | E06B 3/56 | 52/171.3 |
| 2014/0065329 A1 * | 3/2014 | Showers | E06B 3/6715 | 428/34 |
| 2014/0087100 A1 | 3/2014 | Yaoita | | |
| 2014/0186556 A1 * | 7/2014 | Dear | E06B 3/24 | 428/34 |
| 2015/0075902 A1 * | 3/2015 | Schreiber | E06B 3/6612 | 181/294 |
| 2015/0322708 A1 * | 11/2015 | Kotowski | E06B 3/66304 | 52/172 |
| 2015/0345208 A1 * | 12/2015 | Boulanger | E06B 3/673 | 428/34 |
| 2016/0229155 A1 * | 8/2016 | Sienerth | B60J 1/02 | |
| 2016/0316641 A1 * | 11/2016 | Metin | E04D 3/06 | |
| 2017/0253524 A1 * | 9/2017 | Weidner | C03C 17/3681 | |

FOREIGN PATENT DOCUMENTS

| | | | | |
|---|---|---|---|---|
| CN | 105041142 A * | 11/2015 | | |
| DE | 10034764 A1 * | 12/2001 | | E06B 3/6612 |
| EP | 2592209 A1 * | 5/2013 | | E06B 3/6775 |
| JP | 06127981 A * | 5/1994 | | B32B 17/10486 |
| JP | 07150870 A * | 6/1995 | | E06B 3/6612 |
| JP | 07232640 A * | 9/1995 | | E06B 3/6612 |
| JP | 2005-145725 A | 6/2005 | | |
| JP | 2005-146825 A | 6/2005 | | |
| JP | 2005146825 A * | 6/2005 | | |
| JP | 2006083675 A * | 3/2006 | | B32B 17/10486 |
| JP | 2008045013 A * | 2/2008 | | E06B 3/6612 |
| JP | 2012-237147 A | 12/2012 | | |
| JP | 2012237147 A * | 12/2012 | | |
| JP | 5436489 B2 | 3/2014 | | |
| JP | 2015-007359 A | 1/2015 | | |
| JP | 2015007359 A * | 1/2015 | | |
| KR | 10-2004-0025751 A | 3/2004 | | |
| KR | 10-0996657 B1 | 11/2010 | | |
| KR | 20110092039 A * | 8/2011 | | |

(56) References Cited

FOREIGN PATENT DOCUMENTS

| KR | 10-2013-0012666 A | 2/2013 |
|---|---|---|
| KR | 10-2013-0108501 A | 10/2013 |
| KR | 10-2014-0024416 A | 2/2014 |
| KR | 10-1660517 B1 | 9/2016 |

OTHER PUBLICATIONS

Machine Translation of JP-2015007359-A, Jan. 2015 (Year: 2015).*
Seo et al., Diffused Reflection of Microcellular Foamed Polycarbonate, Mar. 2009, Polymer-Plastics Technology and Engineering, vol. 48, Issue 4, pp. 351-358 (Year: 2009).*
Barlow et al., Impact Strength of High Density Solid-State Microcellular Polycarbonate Foams, Sep. 2000, Journal of Engineering Materials and Technology, vol. 123, Issue 2, pp. 229-233 (Year: 2000).*
Krause et al., Microcellular Foaming of Amorphous High-Tg Polymers Using Carbon Dioxide, Jan. 2001, Macromolecules, vol. 34, Issue 4, pp. 874-884 (Year: 2001).*
Bledzki et al., Polycarbonate Microfoams with a Smooth Surface and Higher Notched Impact Strength, Nov. 2004, Journal of Cellular Plastics, vol. 40, issue 6, pp. 489-496 (Year: 2004).*
Schultz et al., Evacuated aerogel glazings, Mar. 2008, Vacuum, vol. 82, Issue 7, pp. 723-729 (Year: 2008).*
Reglero Ruiz et al., Two-step micro cellular foaming of amorphous polymers in supercritical CO2, May 2011, The Journal of Supercritical Fluids, vol. 57, Issue 1, pp. 87-94 (Year: 2011).*
Ma, et al., Fabrication of microcellular polycarbonate foams with unimodal or bimodal cell-size distributions using supercritical carbon dioxide as a blowing agent. Dec. 2013, Journal of Cellular Plastics, vol. 50, pp. 55-79 (Year: 2013).*
KR Grant of Patent dated Apr. 25, 2017 as received in Application No. 10-2016-0139923 (English Translation).
KR Office Action dated Dec. 26, 2016 as received in Application No. 10-2016-0139923 (English Translation).

* cited by examiner

[FIG. 1]
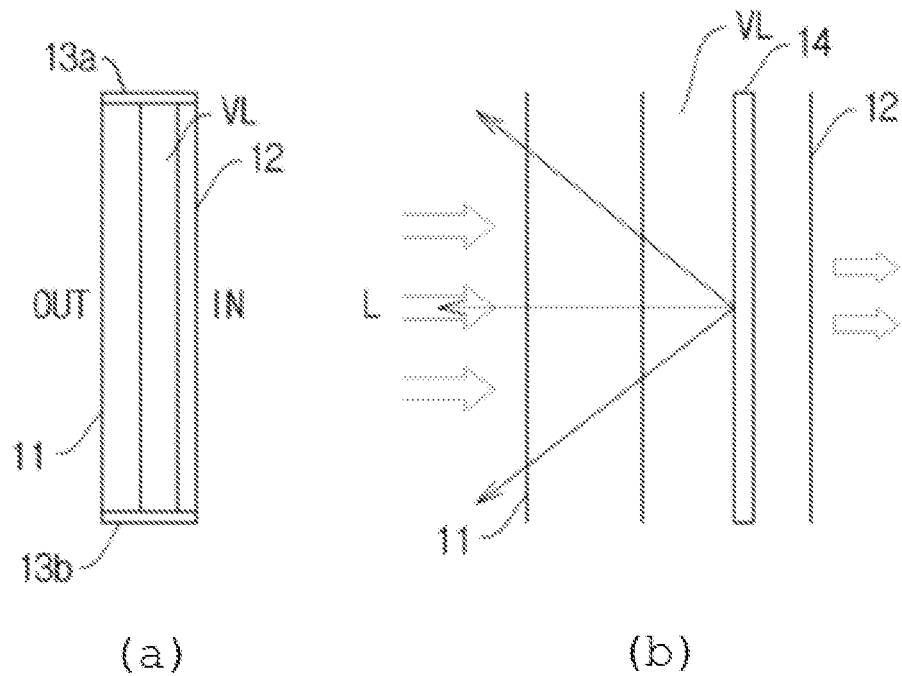
(a)        (b)
[FIG. 2]
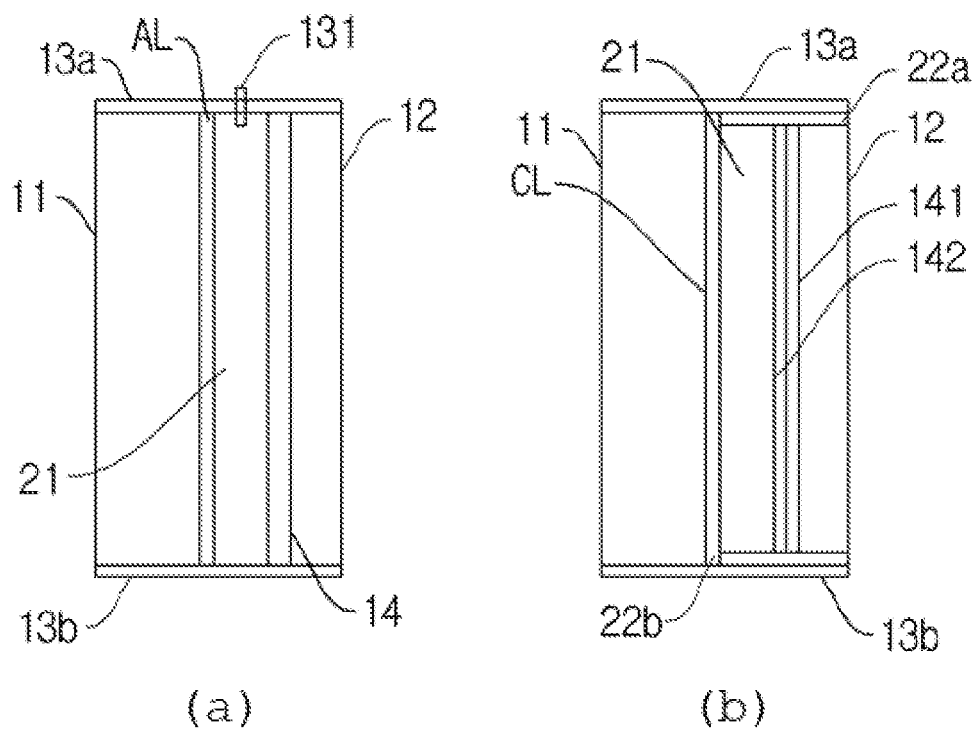
(a)        (b)

[FIG. 3]
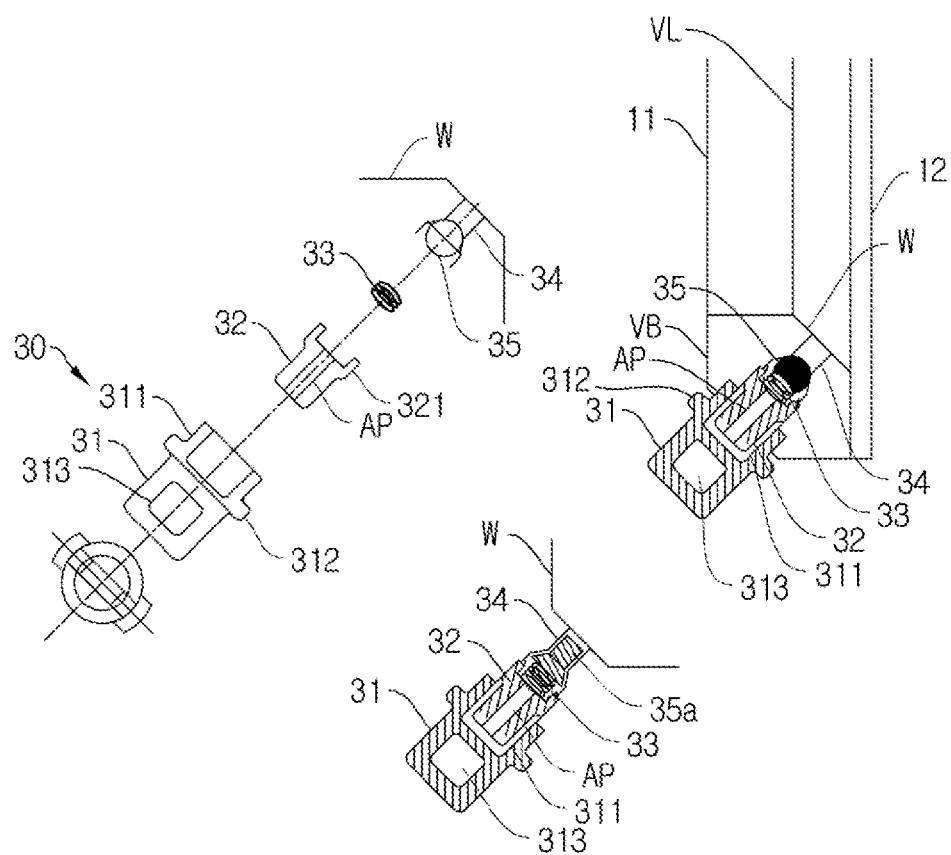

DOUBLE GLAZED WINDOW OF POLYCARBONATE LAYER

TECHNICAL FIELD

The present invention relates to a double glazed window of a polycarbonate layer, and particularly, a double glazed window with a polycarbonate layer, which includes an outer glass layer and an inner polycarbonate layer so as to have improved thermal insulation properties and earthquake resistance.

BACKGROUND ART

A window as the means for ventilation and lighting of a room may be made of various materials that can ensure permeability and thermal insulation. In general, the window may be made of glass as a transparent material. However, glass has low thermal insulation properties and may be fabricated into a double-pane structure in order to supplement low thermal insulation properties of glass. For instance, a double-pane window including a silver coating film while forming a dry air layer between the two glass layers may be installed in various structures. On the other hand, a glass window may cause an increase in heat loss during warming or cooling of a building. In order to solve such problems, low-emission (low emissivity) glass may be used. Herein, the low emissivity glass refers to a material coated with a substance such as metal on the glass surface to increase reflectance of infrared light to thus decrease heat transfer. Further, in order to prevent accidents due to breakage of glass, a glass fabricated in a special way, such as reinforced glass, may be used.

Korean Patent Registration No. 10-0996657 discloses a multilayered glass structure, including: a horizontal frame and a vertical frame to form a framework of a window; a support bar which protrudes in a direction perpendicular to an outer wall face of the horizontal frame and the vertical frame and supports a pair of glass panes arranged by interposing a spacer therebetween; and a fixed sill (or window sill) in a support bracket form having a rectangular cross-section, one side of which is open, wherein the horizontal frame and the vertical frame protrude in parallel in a longitudinal direction such that at least one or more additional glass panes are installed at a predetermined interval to the pair glass panes.

Korean Patent Registration No. 10-1660517 discloses a heat insulation glass consisting of: a first glass plate; a synthetic resin plate spaced apart from the first glass plate; a second glass plate spaced apart from the synthetic resin plate; and a spacing bar which is interposed between the first glass plate and the synthetic resin plate and also at an outer border side between the synthetic resin plate and the second glass plate, so as to space the glass plates as well the synthetic resin plate at a predetermined interval.

Korean Patent Laid-Open Publication No. 10-2013-0108501 discloses a multilayer window structure, including: one window pane made of glass; a hollow ring type spacer made of polycarbonate, which is arranged to extend along the respective periphery of the one window pane and the other window pane, and has a hole at an air layer side between the one window pane and the other window pane; primary sealing members made of an elastic material, each of which has a thickness of 0.5 mm or more and a width of 6 mm or more and extends along the respective periphery of the one window pane and the other window pane, in addition, which are disposed between the one window pane and the spacer and between the other window pane and the spacer, respectively.

Such conventional or known multilayer structure window or dual structure window is complex in terms of construction, entails increase in production costs, and has a disadvantage of weak earthquake resistance or impact resistance.

The present invention has been proposed to solve the problems of the conventional art and has the following objects.

DISCLOSURE

Technical Problem

An object of the present invention is to provide a double glazed window with a polycarbonate layer fabricated by preparing a vacuum layer between a glass layer and a polycarbonate layer, so as to improve thermal insulation properties, construction efficiency, impact resistance and earthquake resistance.

Technical Solution

According to a preferred embodiment of the present invention, the double glazed window with a polycarbonate layer may include: a glass layer to form an outer layer; a polycarbonate layer to form an inner layer; a vacuum layer formed between the glass layer and the polycarbonate layer; and a sealing means for sealing the vacuum layer while binding the glass layer and the polycarbonate layer.

According to another preferred embodiment of the present invention, the vacuum layer may be formed using a porous vacuum material layer.

According to another preferred embodiment of the present invention, an aluminum oxide layer provided on one face of the polycarbonate layer may be further included.

According to a further preferred embodiment of the present invention, the polycarbonate layer may be fabricated using polycarbonate foam having a density of 0.35 to 1.10 g/cm$^3$ and a cell size of 5.0 to 18.0 μm.

Advantageous Effects

The glazed window of the present invention may exhibit a combination of features of the glass material and features of the polycarbonate material. The glazed window of the present invention may enable simple manufacturing and construction work since the inner layer is made of polycarbonate. The glazed window of the present invention may improve thermal insulation since the vacuum layer is formed between the glass layer and the polycarbonate layer. In addition, the glazed window of the present invention may improve earthquake resistance and impact resistance since the window is fabricated using glass and polycarbonate foam materials.

DESCRIPTION OF DRAWINGS

FIG. 1 illustrates an embodiment of the glazed window according to the present invention.

FIG. 2 illustrates another embodiment of the glazed window according to the present invention.

FIG. 3 illustrates an embodiment of a vacuum suction device applied to the glazed window according to the present invention.

BEST MODE

Hereinafter, with reference to the embodiments proposed in the accompanying drawings, the present invention will be described in detail. However, these embodiments are for clearly understanding the present invention only and the present invention is not particularly limited thereto. In the following description, since components denoted by the same numeral in different drawings have substantially similar functions, these components are not repeatedly explained if not required for the understanding of the present invention. Further, known components will be briefly described or a description thereof will be omitted. However, it is not understood that such components are excluded from the embodiments of the present invention.

FIG. 1 illustrates an embodiment of the glazed window according to the present invention.

Referring to FIG. 1, the glazed window with a polycarbonate layer may include a glass layer 11 to form an outer layer; a polycarbonate layer 12 to form an inner layer; a vacuum layer (VL) formed between the glass layer 11 and the polycarbonate layer 12; and sealing means 13a and 13b for sealing the vacuum layer (VL) while binding the glass layer 11 and the polycarbonate layer 12.

The glazed window of the present invention is applicable to various types of buildings and has a multilayer or dual-window structure. The glazed window may have a structure capable of being open and closed or a fixed structure, and may be installed in any of window frames having different structures.

The glass layer 11 may be made of various materials used in glazed windows such as a typical glass, tempered (or reinforced) glass or composite glass, and may have adequate transparency. The glass layer 11 may be used to form an outer layer in contact with the external environment (OUT) and may have a desirable thickness. The polycarbonate layer 12 used for forming an inner layer in contact with internal environment (IN) may be fabricated using polycarbonate or polycarbonate foam. The polycarbonate may comprise a synthetic resin material which has a density of 1.20 to 1.22 g/cm$^3$, a thermal conductivity of 0.19 to 0.22 W/(m·K), a coefficient of linear expansion of 65 to 70×10−6K, a refractive index of 1.584 to 1.586, and a specific heat of 1.2 to 1.3 kJ/(kg·K). The polycarbonate has advantages including high mechanical strength, lighter weight than glass, transparency and high thermal resistance. The polycarbonate also has disadvantages of easily being scratched due to low surface intensity (or surface hardness).

The polycarbonate layer 12 applied to the glazed window of the present invention may have a thickness of 1 to 15 mm, and may be formed with a small thickness depending upon the glass layer 11. For instance, the polycarbonate layer may have a thickness of 4/5 to 1/10 times the thickness of the glass layer 11, without being limited thereto. In order to supplement the surface hardness of the polycarbonate, a metal having light transmission property may be used to coat the surface of the polycarbonate or a metal film may be used to protect the surface of the polycarbonate. For instance, the surface of the polycarbonate may be coated with aluminum oxide (Al2O3) or an aluminum oxide film in a thickness of 1.0 to 100 μm. Such aluminum oxide coating may be performed using aluminum oxide in a powder form having an average diameter of 0.1 to 0.9 μm. The aluminum oxide film may be fabricated by applying aluminum oxide powder having the aforementioned diameter to a transparent synthetic resin material. Formation of a metal coating layer or a metal film layer on the surface of the polycarbonate may be performed according to different methods, without particular limitation to the embodiments proposed in the present invention.

According to the present invention, the polycarbonate layer 12 may be made from polycarbonate foam, wherein the polycarbonate foam may be formed by foaming polycarbonate particles with carbon dioxide. For instance, foaming polycarbonate particles using supercritical carbon dioxide with a pressure of 2 to 6 MPa at a saturation temperature of 20 to 30° C. may produce polycarbonate foam having a density of 0.35 to 1.10 g/cm$^3$ and a cell size of 5.0 to 18.0 μm. When the polycarbonate layer 12 is fabricated using the above polycarbonate foam, the polycarbonate layer 12 may become relatively thin and lightweight. It was found that the polycarbonate foam used to form the polycarbonate layer exhibits increase in thermal insulation properties and decrease in thermal conductivity with increasing cell size. Further, the polycarbonate foam used to form the polycarbonate layer 12 showed an increase in visible light transmittance with increasing pore size ('porosity'). For instance, if the polycarbonate foam has a thickness of 1/3 to 1/2 times the thickness of the glass layer 11, a density of 0.70 to 0.80 g/cm$^3$ and a cell size or diameter of 8 to 12 μm, the polycarbonate foam showed relatively excellent thermal insulation and light transmission properties. Further, the surface hardness may be improved by coating an inner surface of the polycarbonate layer 12 with aluminum oxide in a thickness of 30 to 80 μm. Between the glass layer 11 and the polycarbonate layer 12, a vacuum layer (VL) may be further provided. For instance, the vacuum layer (VL) may be formed in a thickness of 0.1 to 1.0 mm. In the present text, the vacuum layer refers to, for example, a condition wherein a gas pressure of not more than 0.1 bar, preferably, 0.01 bar, and most preferably, 0.001 bar is maintained. The vacuum condition may be maintained by sealing means 13a and 13b that seal peripheral sides of both the glass layer 11 and the polycarbonate layer 12 from each other. Alternatively, the vacuum layer (VL) may be formed along with the polycarbonate layer 12. For instance, a material layer such as porous fumed silica is bound to the outside of the polycarbonate layer 12 to form a vacuum layer (VL) while sealing the polycarbonate layer. Moreover, the glass layer 11 may be bound to one face of the vacuum layer (VL), thereby completing the double glazed window of the present invention.

Referring to FIG. 1(b), external light (L) may be transmitted through the glass layer and then transferred to the vacuum layer (VL). Further, because of thermal insulation by the vacuum layer (VL), heat does not enter the polycarbonate layer and light is partially reflected while most of the light can be transmitted through the polycarbonate layer 12 and delivered to the inside of a room. If needed, a light absorption layer 14 may be disposed on the outside of the polycarbonate layer 12. The light absorption layer 14 may be, for example, a film capable of absorbing ultraviolet (UV) or infrared light (IR), or may have a light-scattering structure. For instance, the light absorption layer 14 may be configured to have, for example, an embossed structure and, according to such structure, UV or IR is converted into heat while being scattered so as to form a heat curtain at the front of the polycarbonate layer 12, thereby improving thermal insulation.

The glass layer 11 and the polycarbonate layer 12 may be combined in a variety of structures to form a vacuum layer (VL) for improvement of thermal insulating function.

Preferred Embodiment for Carrying Out Invention

FIG. 2 illustrates another embodiment of the glazed window according to the present invention.

Referring to FIG. 2(a), the vacuum layer between the glass layer 11 and the polycarbonate layer 12 may be formed using a vacuum material layer 21 such as a fumed silica layer. The vacuum material layer 21 may be made from fumed silica having diverse pores along with a typical raw material. For example, the vacuum material layer may be formed using fumed silica, which is combined by a clay binder containing a metal element such as Al, Mg or Fe, and has pores of 1 to 200 nm or an average diameter of 0.1 to 1.0 µm. As described above, the vacuum material layer 21 may have a thickness of 0.1 to 1 mm and, in a case where the vacuum layer is made from a porous material such as fumed silica, the vacuum material layer 21 may be formed in a thickness of 0.3 to 2.0 mm. After forming the vacuum material layer 21, a porous adhesive layer (AL) may be provided on the surface of the vacuum material layer 21. The porous adhesive layer (AL) may be made of, for example, a synthetic resin material. More particularly, forming the adhesive based on a synthetic resin material in a separate band form or in the form of a separate adhesive area may result in a porous adhesive layer (AL). Such a porous adhesive layer (AL) may be prepared to allow light transmission without limit and have adhesion property by which the glass layer 11 can be adhered to the porous adhesive layer. Further, the glass layer 11 may be adhered to the porous adhesive layer (AL). Sealing means 13a and 13b may be disposed around a peripheral side of the porous adhesive layer. Air in the vacuum material layer 21 may be obtained by, for example, connecting a means such as a vacuum pump to a vacuum generating channel 131 provided in the seal means 13a and 13b and operating the same. Thereafter, sealing the vacuum generating channel 131 may generate a vacuum state inside the vacuum material layer 21. Further, as described above, the light absorption layer 14 may be provided on the outside of the polycarbonate layer 12.

Referring to FIG. 2(b), two light absorption layers 141 and 142 may be provided on the outside of the polycarbonate layer 12. The light absorption layers 141 and 142 may include, for example, an infrared (IR) absorption layer and an ultraviolet (UV) absorption layer, and have surface protrusion structures different from each other such as different types of embossing. That is, such different surface protrusion structures may increase light scattering properties, and therefore, the light absorption layers 141 and 142 may have a thermal curtain function. The light absorption layers 141 and 142 may be combined with the vacuum material layer 21, and the vacuum material layer 21 may be formed using the fumed silica material having a filler function as described above. When the vacuum material layer 21 made of the fumed silica material having a filler function is combined with the light absorption layers 141 and 142, one face of the vacuum material layer 21 may be sealed by a shielding adhesive (CL) such as, for example, a silicon or acryl adhesive, which has light transmission property and is not gas-permeable, simultaneously. Further, respective peripheral sides of the polycarbonate layer 12, the light absorption layers 141 and 142, and the vacuum material layer 21 may be sealed by sealing adhesives 22a and 22b. At the same time, the vacuum material layer 21 may be evacuated and sealed simultaneously. The shielding adhesive (CL) or the sealing adhesives 22a and 22b may be gas-impermeable. The shielding adhesive (CL) may be made of a transparent material. The shielding adhesive (CL) or the sealing adhesives 22a and 22b may each have a thickness of 1 to 20 µm, without being particularly limited thereto. When the polycarbonate 12 and the vacuum layer are combined according to the above described method to thus fabricate a vacuum polycarbonate module, the fabricated module may be combined with the glass layer 11. The glass layer 11 may be bound to the vacuum material layer 21 by the shielding adhesive (CL), followed by rigidly binding using the sealing means 13a and 13b. The sealing means 13a and 13b may be made from a synthetic resin or metal material, and may be configured to have a structure capable of being coupled to a window frame. Further, since the inner layer described above is formed using a polycarbonate material, impact resistance and earthquake resistance may be reinforced and, at the same time, the above functions may be further improved by the vacuum layer or the adhesive layer.

The vacuum layer according to the present invention may have a variety of structures without particular limitation to the proposed embodiments.

FIG. 3 illustrates an embodiment of a vacuum suction device applicable to the glazed window according to the present invention.

Referring to FIG. 3, the vacuum layer (VL) formed between the glass layer 11 and the polycarbonate layer 12 may generate a vacuum state or be held in such vacuum state by the vacuum suction device.

The vacuum suction device may include: a closed body 31 formed in a cylindrical shape and having a cylinder space 311 therein; an actuating piston 32 movably coupled to the cylinder space 311; a fixture member 34 coupled at the front of the actuating piston 32; a length-modified elastic means 33 coupled at the front of the actuating piston 32; and an inflow control unit 35 or 35a disposed at the end of the length modified elastic means 33 and having limited movement by the fixture means 33.

The closed body 31 may be further provided with a contact blade 312 around an outer peripheral side of the closed body 31, and a gas flow path (AP) may be provided along the center line in a length direction of the actuating piston 32 in a cylinder form. The gas flow path (AP) may be formed to have both open ends and connected to a discharge space 313 formed in the closed body 31 to allow gas flow. The fixture member 34 and the actuating piston 32 may be integrally formed. Further, the fixture member 34 may have a structure wherein one end of the fixture member at a wall face is in close contact with a wall face (W) of a connection module (CM). Further, the fixture member may be made of a flexible material. The gas flow path may be formed inside the fixture member 34 and configured to be opened and closed by a first spherical inflow control means 35 or a second inflow control means 35a.

A vacuum generating block (VB) may be disposed at one end of the glass layer 11, and one wall face (W) of the vacuum generating block (VB) may be in contact with the vacuum layer (VL). One end of the fixture member 34 may enter the inside of the vacuum layer (VL) through the wall face (W). Without application of pressure from the outside, the fixture member 34 is opened by the first and second inflow control means 35 and 35a. In such a condition, the discharge space 313, the cylinder space 311 and a coupling space of the actuating piston 32 and the gas flow path (AP) may be in a vacuum state by a means such as a vacuum pump. Accordingly, air present in the vacuum layer (VL) may apply pressure to the first and second inflow control means 35, and may be discharged to the outside through a gas discharge space 313 via the gas flow path (AP). The second inflow control means 35a may have a structure wherein one side of the control means is formed in a conical shape, and the control means extends in a cylinder form to the end of the conical shape and is received in the fixture member 34 while forming a gap inside the gas flow path in the fixture member 34.

The vacuum suction device may be configured to be entirely or partially fixed to the glazed window. Further, the vacuum suction device may be configured in a variety of structures, and the vacuum layer (VL) may also be formed in different ways.

The glazed window of the present invention may achieve a combination of both the features of a glass material and the features of a polycarbonate material. The glazed window of the present invention may ensure simple manufacturing and construction work since an inner layer of the glazed window is made of a polycarbonate material. The glazed window of the present invention may achieve improvement in thermal insulation by forming a vacuum layer between the glass layer and the polycarbonate layer. Further, the glazed window of the present invention may achieve improvement in earthquake resistance and impact resistance by manufacturing the glazed window using glass and polycarbonate foam materials.

Although the present invention has been described in detail with reference to the proposed embodiments, those skilled in the art will appreciate that a variety of modifications and alterations may be possible within the scope of the present invention with reference to the proposed embodiments without departing from technical spirit of the invention. The present invention is not restricted by such modifications and alterations but may be defined by the appended claims.

INDUSTRIAL APPLICABILITY

The glazed window according to the present invention may exhibit advantages of a glass material in combination with advantages of a polycarbonate material.

The invention claimed is:

1. A double glazed window with a polycarbonate layer, comprising:
   a glass layer to form an outer layer, a polycarbonate layer to form an inner layer;
   a vacuum layer (VL) formed between the glass layer and the polycarbonate layer, and
   a sealing means for sealing the vacuum layer (VL) while binding the glass layer and the polycarbonate layer,
   wherein the polycarbonate layer is made of a light-transmitting polycarbonate foam which has a density of 0.35 to 1.10 g/cm 3 and a cell size of 5.0 to 18.0 µm.

2. The double glazed window according to claim 1, wherein the vacuum layer (VL) is formed using a porous vacuum material layer.

3. The double glazed window according to claim 2, wherein the porous vacuum material layer is a fumed silica.

4. The double glazed window according to claim 3, wherein the fumed silica is combined by a clay binder and a metal element.

5. The double glazed window according to claim 2, wherein a light-transmitting porous adhesive layer is formed on the surface of the porous vacuum material layer and adhered to the glass layer.

6. The double glazed window according to claim 1, wherein at least one light absorption layer is provided on the polycarbonate layer surface facing the glass layer, wherein light absorption layer is a film capable of absorbing ultraviolet (UV) or infrared light (IR) and/or may have a light-scattering structure.

7. The double glazed window according to claim 6, wherein the at least one light absorption layer is two light absorption layers comprising an infrared (IR) absorption layer and an ultraviolet (UV) absorption layer and/or have light-scattering surface protrusion structures different from each other.

8. The double glazed window according to claim 7, wherein the vacuum layer is a porous vacuum material layer comprising fumed silica and the light absorption layers are combined with the porous vacuum material layer, wherein a face of the porous vacuum material layer is sealed by a shielding adhesive that is light-transmitting and gas impermeable.

9. The double glazed window according to claim 8, wherein peripheral sides of the porous vacuum material layer, the light absorption layers, and the polycarbonate layer are sealed using sealing adhesives to form a vacuum polycarbonate module.

10. The double glazed window according to claim 9, wherein the vacuum polycarbonate module is combined with the glass layer via the shielding adhesive and followed by binding with the sealing means.

11. The double glazed window according to claim 1, wherein the polycarbonate layer has a thickness of 1 to 15 mm.

12. The double glazed window according to claim 11, wherein the thickness of the polycarbonate layer is ⅒ to ⅘ (0.1 to 0.8) times a thickness of the glass layer.

13. The double glazed window according to claim 1, further comprising an aluminum oxide layer provided on one side of the polycarbonate layer.

14. The double glazed window according to claim 13, wherein the aluminum oxide layer protects and supplements the surface hardness of the polycarbonate layer.

15. The double glazed window according to claim 13, wherein the aluminum oxide layer is formed as a coating comprising aluminum oxide powder or as a film comprising aluminum oxide powder and a transparent synthetic resin.

16. The double glazed window according to claim 1, wherein the sealing means includes a vacuum generating channel.

17. The double glazed window according to claim 16, wherein the vacuum generating channel is defined by a vacuum block comprising a vacuum suction device that generates and maintains the vacuum state of the vacuum layer.

18. The double glazed window according to claim 1, wherein the sealing means is a synthetic resin or metal material and comprises a structure capable of being coupled to a window frame.

19. A building window comprising the double glazed window according to claim 1 in a structure that is fixed or capable of being open and closed.

* * * * *